United States Patent [19]

Kirby et al.

[11] Patent Number: 4,872,148
[45] Date of Patent: Oct. 3, 1989

[54] ULTRASONIC TRANSDUCER FOR USE IN A CORROSIVE/ABRASIVE ENVIRONMENT

[75] Inventors: John P. Kirby, Peabody; Richard Paglia, Carlisle, both of Mass.

[73] Assignee: Polaroid Corporation, Cambridge, Mass.

[21] Appl. No.: 587,706

[22] Filed: Mar. 8, 1984

[51] Int. Cl.$^4$ ............................................. H04R 15/00
[52] U.S. Cl. ................................... 367/172; 367/174; 381/191
[58] Field of Search ............ 179/111 R, 111 E, 181 R; 310/324, 325, 332; 367/140, 161, 162, 163, 165, 172, 173, 174; 181/148–150, 171, 172

[56] References Cited

U.S. PATENT DOCUMENTS

| | | | |
|---|---|---|---|
| 3,768,069 | 10/1973 | Abbagnaro | 367/174 |
| 3,778,562 | 12/1973 | Wright | 179/111 R |
| 3,821,492 | 6/1974 | Tamura et al. | 179/111 E |
| 3,944,756 | 3/1976 | Lininger | 179/111 R |
| 4,117,275 | 9/1978 | Miyanaga | 179/111 R |
| 4,403,117 | 9/1983 | Paglia | 179/111 R |

FOREIGN PATENT DOCUMENTS

| | | | |
|---|---|---|---|
| 0065810 | 12/1982 | European Pat. Off. | 179/111 R |
| 0125794 | 9/1980 | Japan | 367/189 |

*Primary Examiner*—Brian S. Steinberger
*Attorney, Agent, or Firm*—John J. Kelleher

[57] ABSTRACT

An ultrasonic transducer assembly capable of being operated in a corrosive and/or abrasive environment that might otherwise degrade transducer performance and/or damage transducer related components. The assembly includes an ultrasonic transducer of the type having a vibratile diaphragm supported at its periphery by a support housing and having the diaphragm center portion spaced a predetermined distance from a protective perforated cover. A channel is provided in the transducer between opposite sides of the vibratile diaphragm to avoid temperature induced pressure differentials between gases (air) present in the space immediately adjacent opposite diaphragm surfaces. A plastic film is adhesively attached to the outer surface of this diaphragm-protecting cover and the entire transducer is enclosed within an outer housing. A flexible seal engages the plastic film and an outer housing surface. With this arrangement the outer housing interior is divided into two isolated spacial volumes with one volume being in direct communication with the atmosphere and with the other volume (formed by the outer housing, plastic film and flexible seal) forming a chamber that completely isolates the entire ultrasonic transducer from its operating environment. A tube couples the interior of the transducer containing chamber to a corrosive gas and foreign particle free environment at a remote protected location for the purpose of neutralizing any performance-degrading and/or protective film distorting pressure differentials between the two spacial volumes while avoiding direct contact between the transducer and/or related components and environmental components in the atmosphere potentially harmful to transducer performance, during such pressure neutralization.

15 Claims, 3 Drawing Sheets

U.S. Patent  Oct. 3, 1989  Sheet 1 of 3  4,872,148
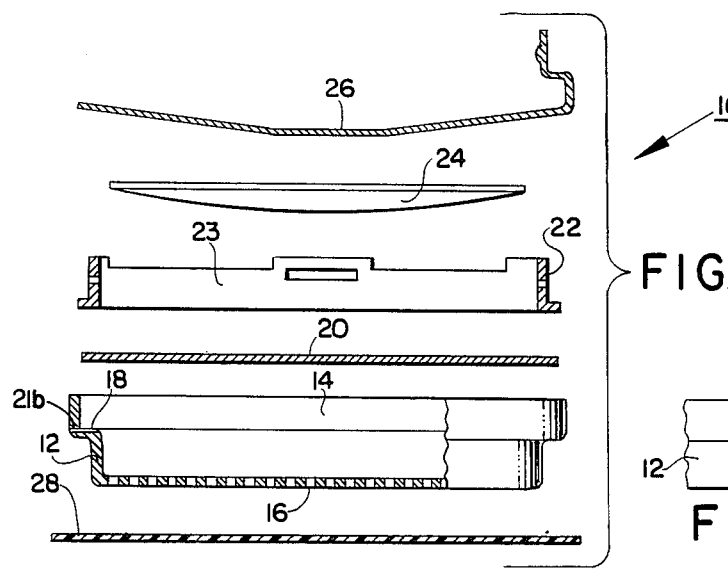
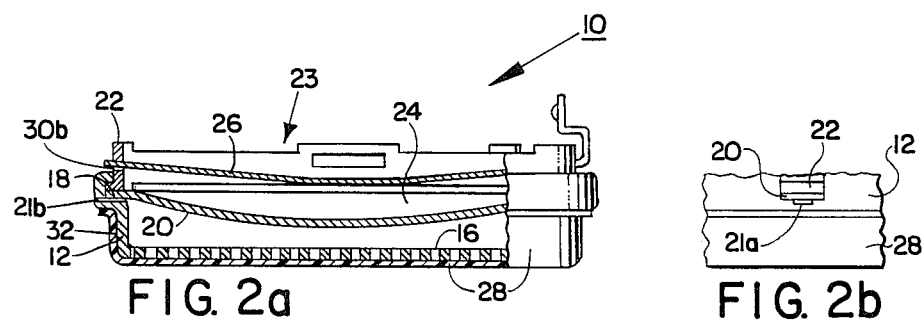
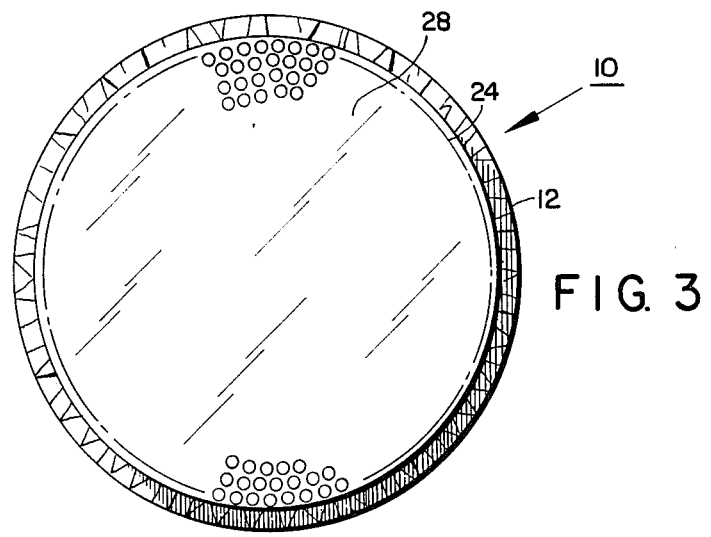

ULTRASONIC TRANSDUCER FOR USE IN A CORROSIVE/ABRASIVE ENVIRONMENT

BACKGROUND OF THE INVENTION

The present invention relates to transducers employed in environments normally harmful to transducer performance and/or components, in general, and to ultrasonic capacitance-type transducers employing a vibratile diaphragm, for use in such environments, in particular.

A transducer is commonly understood to be a device that converts one type of energy such as mechanical vibrations into another form of energy such as an electrical signal or vice versa. Many different types of transducers are employed in a variety of measuring systems for the purpose of measuring such diverse quantities as distance to an object, temperature of a body or pressure of a gas, to cite but a few examples. Polaroid Corporation, for example, of Cambridge, Massachusetts, presently manufactures several different types of self-developing cameras wherein each of said cameras employs an adjustable focus lens systems that is automatically focused by a rangefinder that employs a capacitance-type transducer in the determination of subject distance. Subject distance is established by measuring the elapsed time between the transmission of a burst of ultrasonic energy by the transducer toward a particular subject and the detection by the same transducer of a reflection of said burst of energy from said particular subject. An electrical signal generated by the rangefinder representative of this elapsed time and therefore subject distance, is subsequently employed to precisely control lens system focusing.

A capacitance-type ultrasonic transducer employs a sound generating/detecting vibratile diaphragm consisting of a thin plastic film having a gold layer or coating on one side thereof a few hundred angstroms thick. Under normal circumstances, such as in the case of the automatically focused self-developing cameras mentioned above, the gold vibratile diaphragm coating forms a part of the exterior of the device in which it is utilized and would therefore be in direct physical contact with the atmosphere or environment where the device is located or employed. In most applictions, the environment has little or no harmful effect on either the gold diaphragm coating or on transducer performance. However, in some applications, the atmosphere may contain corrosive gases and foreign particles that may be harmful to transducer components and/or may degrade transducer performance.

Distance or rangefinding devices employing an ultrasonic capacitance-type transducer of the type mentioned above are capable of determining the distance to fairly close objects (within 40 ft.) to within relatively close tolerances (approx.±0.5 inch). However, when an attempt was made to employ a rangefinder of this type on the exterior surface of a vehicle where the transducer was exposed to a combination salt-spray and abrasive (sand) environment, the rangefinder either failed to operate or failed to operate properly after a relatively short period of time. Partial or total failure to operate in such an environment was due either to the salt spray entering the rangefinder through openings in or adjacent the transducer and subsequently corroding electrical components therein or to abrasive material striking and thereby abrading the exposed gold coated surface of the vibratile diaphragm, causing a significant deterioration in transducer and therefore rangefinder performance.

The primary object of the present invention is, therefore, to provide a transducer that is capable of being properly operated in an environment normally harmful to transducer performance and/or components.

Another object of the present invention is to provide a capacitance-type ultrasonic transducer that is capable of being properly operated in a corrosive and/or abrasive environment.

A further object of the present invention is to provide a rangefinder incorporating a capacitance-type ultrasonic transducer that is capable of being operated in a corrosive and/or abrasive environment.

Other objects, features and advantages of the present invention will be readily apparent from the following description of the preferred embodiment thereof taken in conjunction with the accompanying drawings.

SUMMARY OF THE INVENTION

In accordance with the present invention, a transducer assembly is provided that is capable of being properly operated in an environment that might otherwise degrade transducer performance and/or damage transducer or transducer related components. The assembly includes a vibratile diaphragmtype sonic transducer enclosed in one part of an outer housing that is divided into two separate volumes by a thin plastic films. Means are provided for neutralizing any potential temperature-induced pressure differentials between gases adjacent opposite sides of the vibratile diaphragm. One of said housing volumes is directly open to the atmosphere and the other of said volumes completely encloses said transducer except for a conduit that couples the interior of said transducer enclosing volume to the atmosphere, at a remote protected location. Coupling both outer housing volumes to the atmosphere neutralizes any potential transducer performance degrading and/or plastic film distorting pressure differentials between said volumes, and coupling the transducer containing volume to the atmosphere at a remote protected location avoids direct contact between the enclosed transducer and environmental conditions in the atmosphere potentially harmful to transducer performance and/or components during such pressure differential neutralization.

BRIEF DESCRIPTION OF THE DRAWINGS

FIG. 1A is an exploded elevational view, partly in section, of a conventional capacitance-type ultrasonic transducer and the protective diaphragm of the present invention.

FIG. 1B is a fragmentary elevational, view of a pressure equalizing channel formed in said housing, as viewed from the right side of drawing FIG. 1A.

FIG. 2A is an elevational view, partly in section, of the transducer of FIG. 1 fully assembled with the protective diaphragm shown therein attached to said transducer in its protective position.

FIG. 2B is a fragmentary elevational view of the ultrasonic transducer employed in the present invention and a pressure equalization channel formed in the housing thereof, as viewed from the right side of drawing FIG. 2A.

FIG. 3 is a bottom view of the perforated transducer housing and of the protective diaphragm as shown in FIG. 2.

DESCRIPTION OF THE PREFERRED EMBODIMENTS

Figure 4:
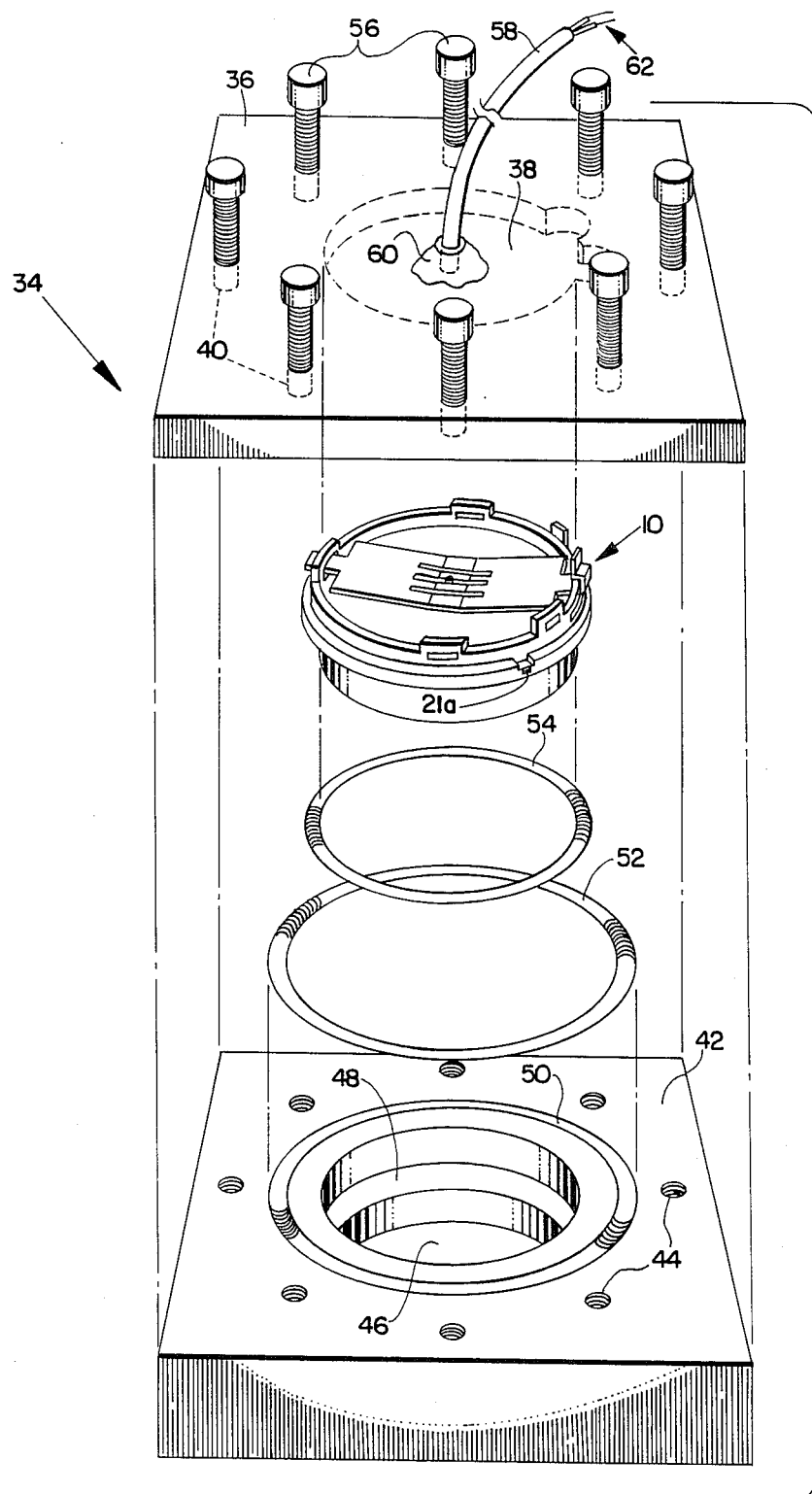
FIG. 4 is an exploded perspective view of the ultrasonic transducer assembly of the present invention that is capable of being operated in a corrosive and/or abrasive environment.

Referring now to the drawings and specifically to FIGS. 1A and 1B, capacitance-type ultrasonic transducer 10 constructed in accordance with the present invention, is depicted. Transducer 10 includes cylindrical housing 12 having open end 14 at one end and partly closed perforated end 16 at the opposite end thereof. Housing 12 also includes flange portion 18 near open end 14 of said housing 12. Flat vibratile diaphragm 20 extends across housing opening 14 and is positioned between support ring 22 and said housing 12. Channels 21A and 21B are formed in flange portion 18 of housing 12 to prevent an airtight seal from being formed between diaphragm 20 and housing 12 at said flange portion 18. Vibratile diaphragm 20 is preferably made from a thin polyamide film sold by the E. I. duPont deNemours Company, Inc under its registered trademark KAPTON. One surface of diaphgram 20 is electrically conductive in that it is coated with a thin layer of gold (approximately 300 A) and the other surface is the dielectric or electrically non-conductive KAPTON. Support ring 22 is of circular cross-section with opening 23 through the center thereof and has a flanged end for cooperative engagement with flange portions 18 of housing 12. Backplate 24, of circular cross-section, includes a crowned electrically conductive surface for cooperative engagement with vibratrile diaphragm 20. Leaf spring 26 provides the mechanical force that maintains backplate 24 in proper physical contact with diaphragm 20. Protective diaphragm 28, whose function is to prevent harmful gasses and/or abrasive materials from entering the perforated end of housing 12, extends completely across said perforated housing end. Diaphragm 28 is preferably made from a thin polyester film sold by the E. I. duPont deNemours Company, Inc. under its registered trademark MYLAR. When assembled, the transducer components described in FIG. 1 are in the positions shown in drawing FIGS. 2 and 3.

Referring to FIGS. 2A, 2B and 3, transducer 10 is assembled by placing a uniform light radial force on diaphragm 20 for the purpose of temporarily maintaining said diaphragm in a relatively flat plane and then positioning said diaphragm over opening 14 (FIG. 1) of transducer housing 12. Diaphragm 20 is then "dished" or formed to the crowned surface of the subsequently mating backplate member. The periphery of said diaphragm 20 is then sandwiched between the flange end of support ring 22 and flange portion 18 of housing 12 and then the one end of housing 12 is clamped onto the flange portion of ring 22 which then places the periphery of diaphragm 20 in a fixed position with respect to housing 12. Channels 21A and 21B prevent an airtight seal from being formed between diaphragm 20 and shoulder portion 18 of transducer housing 12. Crowned backplate 24 is placed in opening 23 of support ring 22 such that the crowned surface of said backplate 24 engages the dielectric or insulative surface of diaphragm 20 previously shaped to said crowned backplate surface. With backplate 24 so positioned, leaf spring 26 is inserted through openings 30A (FIG. 1) and 30B, respectively, in support ring 22 such that the center portion of leaf spring 26 presses against backplate 24 and the ends of leaf spring 26 rest against the walls in openings 30A, 30B of support ring 22. With leaf spring 26 so positioned, diaphragm 20 will be in proper cooperative engagement with the crowned surface of backplate 24.

When transducer 10 is fully assembled, such as in the manner described above, protective diaphragm 28 is then adhesively attached to perforated end 16 of transducer housing 12. Diaphragm 28 includes a thermosetting adhesive coating (not shown) previously applied along the outer edge of one diaphragm 28 surface. With diaphragm 28 positioned over and with its adhesively coated surface facing the perforated end of housing 12, an assembly tool (not shown) stretches diaphragm 28 over and subsequently forms said diaphragm 28 to the external contours of perforated housing 12. While diaphragm 28 is maintained in this stretched, housing contour shaped position, the assembly tool then applies the required amount of heat to the diaphragm and the thermosetting adhesive coating already present thereon to thereby adhesively attach the outer edge of one diaphragm 28 surface to lateral outer surface 32 of housing 12. An example of an assembly tool of the type employed to adhesively attach protective diaphragm 28 to housing 12 is shown in U.S. Pat. No. 4,403,117 to PAGLIA. This combination of transducer 10 and adhesively attached diaphragm 28 are then inserted into protective housing 34 in the manner shown in the drawings of FIGS. 4, 5 and 6.

Figure 5:
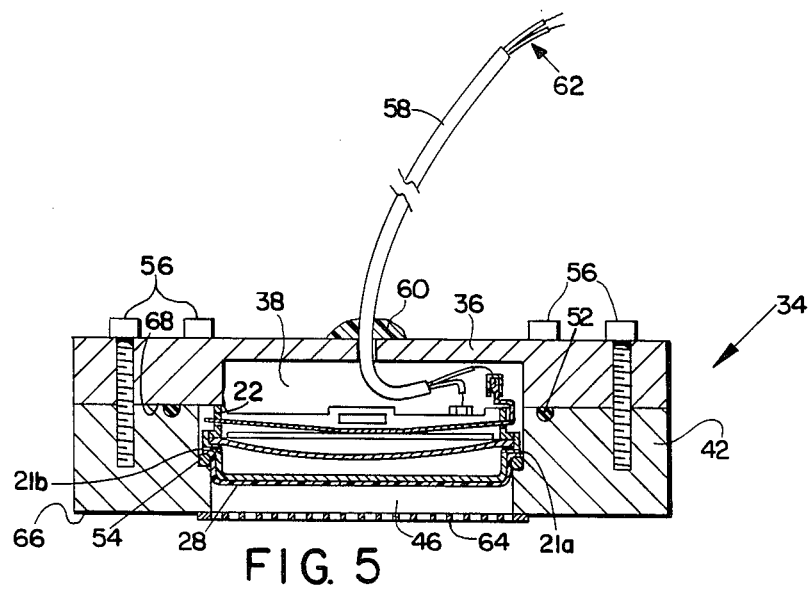
FIG. 5 is an elevational view, partly in section, of the ultrasonic transducer assembly of FIG. 4, fully assembled.
Figure 6:
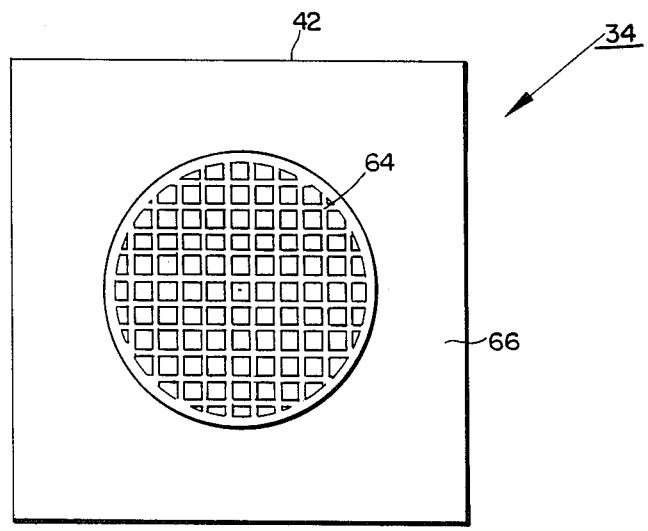
FIG. 6 is a bottom view of the ultrasonic transducer assembly as shown in FIG. 5.

FIG. 4 is an exploded perspective view of protective housing assembly 34 and a perspective view of transducer 10 showing one of the vibratile diaphragm 20 pressure equalizing channels 21A together with protective diaphragm 28 that is attached thereto positioned for placement within said housing assembly 34 for protection from potentially harmful corrosive and/or abrasive environments. With reference to FIGS. 4, 5 and 6, protective housing 34 includes base member 36 having recess 38 in one surface thereof into which portions of transducer 10 project when fully enclosed by housing assembly 34. In addition, a plurality of equally spaced clearance holes 40 are formed in a circular path near the outer edge of said base member 36. Protective housing 34 also includes cover member 42 that has a plurality of equally spaced threaded openings 44 that are formed in a circular path near its outer edge and a large circular opening 46 through the center thereof. One end of opening 46 is of reduced diameter with shoulder portion 48 being formed between the large and small diameter ends. Cover member 42 also includes circular groove 50, of semicircular cross-section, for receiving and locating base member 36 to cover member 42 O-ring seal 52. O-ring 52 forms a seal between transducer assembly base member 36 and cover member 42, O-ring 54 forms a seal between protective diaphragm 28 and shoulder portion 48 of said cover member 42 and machine screws 56 firmly attach cover member 42 to base member 36 when all of these members are fully assembled. Plastic tube 58 passes through an opening in base member 36 and into recess 38 formed therein. Silicone based sealant 60 forms an air-tight seal between the outer surface of plastic tube 58 and base member 36 in the region where said tube 58 enters base member 36. A pair of electrical conductors 62 are routed through plastic tube 58 and into base member recess 38 from a remote location. Protective grill 64 (FIG. 6), which is bonded to surface 66 of cover member 42, prevents relatively large objects from entering opening 46 in cover member 42 and damaging protective diaphragm 28 when diaphragm 28 is mounted within protective assembly 34 in its protective position.

Transducer 10 is enclosed by protective housing 34 in the following manner. Resilient O-ring 54 is placed on shoulder portion 48 within opening 46 in cover member 42. Transducer 10 is then inserted into opening 46 with its protective diaphragm 28 covered perforated end facing shoulder portion 48 of opening 46 until the periphery of diaphragm 28 engages resilient O-ring 54, thereby forming an airtight seal between diaphragm 28 and cover member 42. The ends of electrical conductor pair 62 terminate in spade-type female lugs that are then pressed onto mating male electrical terminals that are respectively connected to backplate 24 and to the electrically conductive surface of diaphragm 20 of ultrasonic transducer 10. Resilient O-ring 52 is then placed in centering groove 50 of cover member 42 and then base member 36 with its recess 38 facing O-ring 52 is placed over transducer 10 so that surface 68 of base member 36 engages said O-ring 52. When base member 36 is so positioned, an airtight seal is formed between cover member 42 and base member 36 by O-ring 52. In addition, surface 68 of cover member 36 also engages the end of support ring 22 of transducer 10 thereby causing a further compression of O-ring 54 and therefore a tighter seal between protective diaphragm 28 and cover member 42. When base member 36 is positioned on cover member 42 such that clearance holes 40 in base member 36 are aligned with threaded holes 44 in cover member 42, machine screws 56 are then placed in these mating holes to securely fastened base member 36 to cover 42. When these members are so fastened, transducer 10 is enclosed in an airtight chamber with a single air vent, a chamber that is formed by rigid plastic base member 36, rigid plastic cover 42, protective diaphragm 28 and O-rings 52 and 54.

DISCUSSION

Even though transducer 10 is enclosed in an airtight chamber with a single vent exiting therefrom, protective diaphragm 28 distorting, temperature induced pressure differentials between gases immediately adjacent opposite sides of diaphragm 20 are precluded by the presence of pressure equalizing channels 21A and 21B. If an airtight seal were to be formed between vibratile diaphragm 20 and shoulder portion 18 of housing 12, an airtight chamber would be estabalished between said vibratile diaphragm 20 and protective diaphragm 28 when transducer assembly 34 (FIG. 5) is fully assembled. If the gas or air in the chamber formed by these two diaphragms is subsequently heated such as by the rays of the sun when transducer assembly 34 is mounted on an external automobile surface, protective diaphragm 28 would become stretched by the expanding heated air trapped within said diaphragm formed chamber. Stretching of diaphragm 28 can cause permanent wrinkles therein that can substantially reduce the amount of object detecting sonic energy that can be transmitted or received by said diaphragm 28.

As mentioned above, the air or spacial volumes adjacent opposite sides of protective diaphragm 28 should have substantially the same pressure in order to avoid degrading the frequency characteristics of the ultrasonic energy transmitted and received by said diaphragm 28 and/or to avoid temperature induced diaphragm 28 distorting pressure differentials which could also degrade diaphragm 28 performance. If chamber 38 within protective housing assembly 34 was completely airtight, such equalization of air pressure would not be possible. Moreover, if the interior of chamber 38 was opened to an operating environment containing corrosive gasses, for example, transducer 10 and/or electrical components interfacing with transducer 10 may become severely damaged. Potentially harmful temperature induced pressure differentials between gases adjacent diaphragm 20 in transducer 10 are precluded by means of channels 21A and 21B (FIGS. 2A and 2B) as previously explained. The apparatus of the present invention avoids such problems by connecting the interior of chamber 28 to a corrosive gas free and particle free environment at a remote location through airtight plastic tube or conduit 58 that has one end opened to such a gas and particle free environment. In the preferred embodiment, electrical conductors 62 that provide vibration generating electrical energy to transducer 10 are routed through tube 58 for convenience only. Separate paths for the passage of pressure equalizing gas and for transducer 10 energizing electrical conductors, respectively, may also be employed if such an arrangement is deemed appropriate.

Placing transducer 10 within housing assembly 34 will protect transducer 10 and certain interfacing electrical components from any corrosive gases and from abrasion by foreign particles that might be present in its operating environment. However, merely enclosing transducer 10 with a chamber for protective purposes could either preclude the passage of sonic energy beyond the walls of said chamber or substantially attenuate the level of such energy. In the present invention, such impediments to sonic energy transmission are avoided by the type of protective chamber employed and where transducer 10 is placed within said chamber.

In the present invention, the protective transducer-enclosing chamber comprises a rigid portion consisting of base member 36 and cover member 42 and a flexible portion consisting of protective diaphragm 28 through which sonic energy is efficiently and effectively directed. Sonic energy generated by vibratile diaphragm 20 of ultrasonic transducer 10 is directed at protective diaphragm 28 thereby causing said diaphragm 28 to sympathetically vibrate at substantially the same frequency and magnitude and for the same length of time as that of diaphragm 20. The sonic energy generated by the symphathetic vibrations of protective diaphragm 28 is then propagated toward a particular remote object or location for object detection purposes. To minimize interference with the sonic energy generated by vibratile diaphragm 20, protective diaphragm 28 is mounted on a nodal point (a point of minimum wave amplitude) in a plane that is substantially one-half wavelength from said diahragm 20 and protective grill 64 on cover member 42 is mounted at another nodal point in a plane that is substantially onehalf wavelength from sonic energy propagating protective diaphragm 28 and one full wavelength from the plane of vibratile diaphragm 20.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. An electroacoustical transducer assembly comprising:
   a backplate;
   a first diaphragm extending across one major surface of said backplate;
   means for equalizing the pressure of gases on opposite sides of said first diaphragm;
   means for activating said first diaphragm to propagate acoustical energy in a direction away from said backplate; and
   means for precluding foreign particles in the gaseous operating environment of said assembly from impinging upon the outwardly disposed face of said first diaphragm, said foreign particle preculding means including a second diaphragm disposed over and spaced from said first diaphragm, said second diaphragm being activated by said acoustical energy to in turn propagate acoustical energy outwardly of said assembly in a direction away from said backplate.

2. The invention of claim 1, wherein said second diaphragm is formed of a polyester film.

3. The invention of claim 2, wherein said polyester film is mylar.

4. The transducer assembly of claim 1, wherein said precluding means includes a support member having a substantially flat perforated section disposed over and spaced from said first diaphragm with said second diaphragm being stretched over the said flat perforated support member section.

5. The transducer assembly of claim 1, wherein said second diaphragm is spaced one-half of wavelength from said first diaphragm.

6. The transducer assembly of claim 4, further comprising a substantially flat protective grill extending across and spaced a predetermined distance from said second diaphragm.

7. The invention of claim 6, wherein said predetermined distance between said protective grill and said second diaphragm is a multiple of one-half of a wavelength.

8. An acoustical transducer assembly comprising:
   a backplate;
   a diaphragm extending across one major surface of said backplate;
   means for equalizing the pressure of gases on opposite sides of said diaphragm; and
   means for activating said diaphragm and for propagating acoustical energy generated thereby outwardly of said assembly in a direction away from said backplate while precluding said diaphragm from being contacted by the gasseous environment immediately surrounding said assembly.

9. The invention of claim 8, wherein said first-mentioned means includes second means for defining a substantially air-tight chamber in which said backplate and said diaphragm are positioned and for venting said chamber to another gaseous environment remote from said chamber and normally substantially free of impurities which could otherwise have deleterious effects on components of said assembly positioned within said chamber.

10. The invention of claim 9 wherein said second means includes tubing extending from said chamber to the remote gaseous environment and said first-mentioned means additionally includes a pair of elongatd electrical conductors respectively coupled to said backplate and to said diaphragm and extending therefrom within said tubing.

11. The invention of claim 9 wherein said second means comprises a second diaphragm extending over and spaced a predeterined distance from said first diaphragm to be activated by said acoustical energy and in turn propagate acoustical energy outwardly of said assembly in a direction away from said backplate, a rigid housing assembly defining an opening positioned over said second diaphragm to prevent said housing assembly from interfering with acoustical energy being propagated by said second diaphragm and means for effecting an airtight seal between said second diaphragm and said housing assembly, said second diaphragm and said housing assembly serving in combination to define said chamber.

12. The invention of claim 11, wherein said second diaphragm is supported by a support member having a substantially flat perforated section disposed over and spaced from said first diaphragm, with said second diaphragm being stretched over the said flat perforated support member section.

13. The invention of claim 11, wherein said predetermined distance between said first and second diaphragms is a multiple of one-half of a wavelength.

14. The invention of claim 11, further comprising a protective outer grill mounted on said housing assembly, extending across and spaced a predetermined distance from said second diaphragm to prevent certain objects from striking said second diaphragm with said protective grill being adjacent the surface of said second diaphragm opposite the diaphragm surface in contact with the perforated section of said said support member.

15. The invention of claim 14, wherein said predetermined distance between said protective grill and said second diaphragm is some multiple of one-half of a wavelength.

* * * * *